United States Patent Office 3,063,989
Patented Nov. 13, 1962

3,063,989
2β-HYDROXY-9α-HALO-11-OXYGENATED PREGNENES
Leland L. Smith, New City, and Harold Mendelsohn and Joseph J. Goodman, Nanuet, N.Y., assignors to American Cyanamid Company, New York, N.Y., a corporation of Maine
No Drawing. Filed Jan. 18, 1960, Ser. No. 2,837
2 Claims. (Cl. 260—239.55)

This invention relates to new steroid compounds. More particularly it relates to 2,21-dihydroxy-4-pregnene 3,20-diketones and esters thereof and method of preparing the same.

Under the fermentation conditions as described by Fried et al., in their U.S. Patents 2,709,705; 2,855,343; 2,855,410 using *Streptomyces roseochromogenus*, (Waksman No. 3689) a product hydroxylated in the 16α-position is obtained from many steroid substrates. The 9α-fluorohydrocortisone 16α-hydroxyl derivative is described in J. Am. Chem. Soc. 79, 4818 (1957).

We have found that when different carbohydrate energy sources are used, with a selected strain *Streptomyces roseochromogenus* (ATCC 3347) the presence of other steroidal products was detected via paper chromatograms. One of these other products has the same order of mobility as the 16α-hydroxylated product, but actually is about 90% as mobile in carefully conducted experiments, so that the presence of the second component can be proven. Chemical studies on the new steroids have been made, and the conclusion drawn that the 9α-fluorohydrocortisone substrate is hydroxylated at a new position, namely, the 2β-position, rather than the 16α-position, in the case of the steroid with 90% of the mobility of 16α-hydroxy-9α-fluorohydrocortisone, and that a steroid with 34% of the mobility of 16α-hydroxy-9α-fluorohydrocortisone is the 2β,16α-dihydroxy-9α-fluorohydrocortisone.

The principal distinction between fermentations which give 2β-hydroxylation and which do not give 2β-hydroxylation of steroid substrates appears to be a matter of selection of strains of *S. roseochromogenus* although medium composition may play a minor role. Under the conditions of the present invention *S. roseochromogenus* (ATCC 3347) will give 2β-hydroxylated steroids in up to fifty percent yields.

The fermentation conditions to prepare the 2β-hydroxy pregnenes of the present invention such as, for example, 2β-hydroxy-9α-fluorohydrocortisone are similar to those described in the prior art with exceptions noted above. The 2β-hydroxylation takes place as the major product when *S. roseochromogenus* (ATCC 3347) is used in medium such as, for example, that described in U.S. Patent 2,855,343.

The isolation of these new 2β-hydroxylated steroids is accomplished by the usual means of solvent extraction of the harvest broth, concentration of the extract, and recovery of the crude steroid crystals. The separation of the crude steroid mixture can best be accomplished by the use of aqueous sodium borate solutions to remove by complex formation those steroids hydroxylated in the 16α-position. Thus with a solvent solution of the mixed steroids, 16α-hydroxy-9α-fluorohydrocortisone is extracted into aqueous borate solution and unaltered 9α-fluorohydrocortisone is also retained in the solvent extract; 2β,16α-dihydroxy-9α-fluorohydrocortisone is also extracted, while 2β-hydroxy-9α-fluorohydrocortisone remains in the organic solvent extract. Thus, the organic solvent extract may be freed of those steroids containing the 16α,17α-cis-diol feature. The so purified solvent extract is then concentrated and subjected to chromatography for the final separation of the desired 2β-hydroxypregnenes.

The 2β-hydroxypregnenes which have present cis-16α,17α-dihydroxy groups react with alkanones and alkanals to produce the corresponding substituted methylenedioxy pregnenes as shown hereinafter in the examples. These same 2β-hydroxylated cis-16α,17α-dihydroxy pregnanes undergo D-homoannulation in the same manner as already known for triamcinolone, and illustrated in Example XXII.

The 2β-hydroxypregnenes such as 2β-hydroxy-9α-fluorohydrocortisone, 2β,16α-dihydroxy-9α-fluorohydrocortisone are active glucocorticoids, while the acetonide type of derivatives of the latter compound is highly active topically.

The following examples illustrate the preparation of the compounds of the present invention.

EXAMPLE I

*Preparation of 9α-Fluoro-2β,11β,17α,21-Tetrahydroxy-4-Pregnene-3,20-Dione*

A fermentation medium composed of cornsteep liquor, 20 g./liter; calcium carbonate, 7 g./l.; ammonium sulfate, 2 g./l.; dipotassium hydrogen phosphate, 3 g./l.; lard oil, 0.2% by volume; using glycerine as carbohydrate source, 30 g./l.; is prepared and inoculated with a 24-hour vegetative growth of *S. roseochromogenus* (ATCC 3347). Fermentation is carried out in 250 ml. Erlenmeyer flasks containing 50 ml. of the sterilized medium. After a 24-hour growth period the culture is charged with 9α-fluorohydrocortisone (9α-fluoro-11β,17α,21-trihydroxy-4-pregnene-3,20-dione) dissolved in dimethylformamide, so that the final solvent concentration in the culture is less than 1% by volume and the final steroid concentration is 500 μg./ml. The culture is aerated by shaking on a rotary shaker at 185 r.p.m. with a two inch diameter throw. The temperature is 26.5° C. After 72 hours of fermentation, the culture is sampled for analysis. A total steroid analysis by polarography indicates 360 μg./ml. of products and unaltered substrate. Paper chromatography indicates that both unaltered substrate and the desired 2β-hydroxy product, 9α-fluoro-2β-hydroxyhydrocortisone (9α-fluoro-2β,11β,17α,21-tetrahydroxy-4-pregnene-3,20-dione) are present together with the 16α-hydroxylated product 9α-fluoro-16α-hydroxyhydrocortisone (9α-fluoro-11β,16α,17α,21-tetrahydroxy-4-pregnene-3,20-dione).

EXAMPLE II

*Preparation of 9α-Fluoro-2β-Hydroxyhydrocortisone*

A fermentation medium essentially the same as that described in Example I except that the amount of glycerine utilized is varied between 40 g./l. and 60 g./l. is used. *S. roseochromogenus* (ATCC 3347) is used for fermentation with 9α-fluorohydrocortisone as the substrate (added in the same manner as described in Example I). After 72 hours of aerated fermentation, the broth is sampled for analysis. Paper chromatograms indicates that unaltered substrate is present together with the 16α-hydroxy product (9α-fluoro-16α-hydroxyhydrocortisone) and the 2β-hydroxylated product (9α-fluoro-2β-hydroxyhydrocortisone). The following proportions are observed on analysis of each fermentation broth:

| Glycerine Level | Time, hours | Total Steroids | 2β- and/or 16α-Hydroxylated Steroids, Percent of Total |
|---|---|---|---|
| 40 g./l. | 48 | 420 | 34 |
|  | 72 | 465 | 44 |
| 50 g./l. | 48 | 462 | 38 |
|  | 72 | 450 | 52 |
| 60 g./l. | 48 | 442 | 44 |
|  | 72 | 475 | 46 |

EXAMPLE III

Preparation of 9α-Fluoro-2β,11β,16α,17α21-Pentahydroxy-4-Pregnene-3,20-Dione To a growing culture of *S. roseochromogenus* (ATCC 3347) prepared as described in Example I, using glycerine as the carbohydrate source, is added 9α-fluoro-16α-hydroxy-hydrocortisone in solution so that the final steroid concentration is 500 μg./ml. After 72 hours of fermentation, paper chromatographic analysis showed the presence of unaltered substrate and the presence of 9α-fluoro-2β,16α - dihydroxyhydrocortisone (9α-fluoro-2β,11β,16α,17α,21-pentahydroxy-4-pregnene-3,20-dione).

EXAMPLE IV

Preparation of 9α-Fluoro-2β,16α-Dihydroxyhydrocortisone

Fermentation using the exact medium composition as described in Example XIV is conducted, except that the strain of microorganism used is *S. roseochromogenus* (ATCC 3347) instead of the Waksman strain. After 96 hours of fermentation, instrumental analysis indicates that no unaltered substrate remained, and that the 9α-fluoro-16α-hydroxyhydrocortisone product is present in 61%, whereas the desired 2β,16α-dihydroxylated product, 9α-fluoro-2β,16α-dihydroxyhydrocortisone, is present in 30% levels.

EXAMPLE V

Preparation of 9α-Fluoro-2β-Hydroxyhydrocortisone

The fermentation broth from a *S. roseochromogenus* (ATCC 3347) fermentation performed as described in Example I is acidified to pH 4.0 with 25% sulfuric acid and the acidified broth filtered through a diatomaceous earth filter pad to remove micelial solids. The clear filtrate is adjusted to pH 7 with 10% sodium carbonate solution and is then extracted with an equal volume of methyl isobutyl ketone. A second extraction is performed and the solvent extracts are combined and concentrated under diminished pressure to a point of incipient crystallization (ca. 1% of the original volume). The crystals so obtained are filtered and consist of 9α-fluoro-16α-hydroxyhydrocortisone, 9α-fluoro-2β-hydroxyhydrocortisone and 9α-fluoro-2β,16α-dihydroxyhydrocortisone, together with traces of other fermentation impurities. Further concentration of the mother liquors yields a second crop of solids, composed essentially of the same steroids as is the first crystal crop, although some unaltered substrate may be present in the second crops.

Recrystallization of the first crop or of the first and second crops combined from a suitable solvent such as alcohol yields the purified 9α-fluoro-16α-hydroxyhydrocortisone and depending on the exact composition of the crude crystalline product obtained from each fermentation, the 9α-fluoro-16α-hydroxyhydrocortisone so produced is either free from 2β-hydroxylated steroids or may still be contaminated with traces of the 2β-hydroxylated steroids, thus requiring further purification operations.

EXAMPLE VI

Separation of 2β-Hydroxylated Products From 16α-Hydroxylated Products

The mother liquors remaining after the first two or three crops of solid 16α-hydroxy-9α-fluorohydrocortisone had been recovered are quite rich proportionately in the 2β-hydroxylated product. The mother liquor is very viscous at this stage, and is diluted with fresh methyl isobutyl ketone for analysis and further separations. A volume of 150 ml. of the mother liquor concentrate obtained as described in Example V, and assaying to contain about 20% by weight of polarographically active steroidal components, is diluted with 300 ml. of methyl isobutyl ketone, and then extracted five times with 600 ml. portions of 5% aqueous sodium tetraborate solution. The fully extracted methyl isobutyl ketone solution is thus free from 16α,17α-diols of the type 9α-fluoro-11β,16α,17α,21-tetrahydroxy-4-pregnene-3,20-dione, etc. as evidenced by paper chromatographic analysis. The several borate extracts are further washed several times with fresh methyl isobutyl ketone to recover small amounts of desired product, and the combined methyl isobutyl ketone solution rich in desired steroid together with the methyl isobutyl ketone washes of the spent borate extracts are concentrated to dryness under reduced pressure. The residue so obtained is analyzed by paper chromatography and found to contain large amounts of the desired steroid, not contaminated with either 9α-fluoro-11β,16α,17α,21-tetrahydroxy-4-pregnene-3,20-dione or with 9α-fluoro-2β,11β,16α,17α,21-pentahydroxy-4-pregnene-3,20-dione.

EXAMPLE VII

Isolation of 2β-Hydroxy-9α-Fluorohydrocortisone (9α-Fluoro - 2β,11β,17α-21-Tetrahydroxy-4-Pregnene-3,20-Dione)

A solution of the desired 2β-hydroxy steroid which has been previously extracted with dilute borate solution according to the Example VI to remove the 16α,17α-diols (9α-fluoro-11β, 16α, 17α,21-tetrahydroxy-4-pregnene-3,20-dione and 9α-fluoro-2β,11β,16α,17α21-pentahydroxy-4-pregnene-3,20-dione) is analyzed by papergram to insure that the 16α, 17α-diols have been properly removed. Such a solution, 780 ml., of desired steroid in methyl isobutyl ketone is treated with 80 g. of activated silica gel, stirred, and concentrated under reduced pressure to dryness to yield a gum adsorbed on silica gel. The adsorbed steroid/silica gel mixture is slurried several times with benzene and concentrated to dryness under reduced pressure each time, to insure the complete removal of methyl isobutyl ketone solvent. The thus-prepared charge of adsorbed steroid/silica gel is slurried in benzene and placed on top of a silica gel column (prepared in benzene, a three-inch column, charged with 950 g. of silica gel slurried in benzene). Elution of the column with benzene, with benzene/ether mixtures, and with pure ether removes unwanted impurities. Then elution with ether/chloroform (95:5, volume/volume) yields a fraction rich in the desired steroid component. After concentration of the eluates to dryness a residue is obtained which is crystallized from methanol, yielding crystals, homogeneous on papergrams as the desired steroid. After recrystallization from methanol, including a charcoal treatment, and from acetone, the product, M.P. 244–248°, was recovered. Further purification yielded pure product, M.P. 245–249°, $[\alpha]_D^{22}$ +1.5° (methanol), $$\lambda_{max.}^{EtOH} \ 239 \ m\mu \ (E_{1\ cm.}^{1\%} \ 352)$$

homogeneous on papergrams, and exhibiting infrared adsorption spectra in KBr disks consistent with the assigned structure.

EXAMPLE VIII

Preparation of 9α-Fluoro-2β,16α-Dihydroxyhydrocortisone

To a 24-hour vegetative growth of *S. roseochromogenus* (ATCC 3347) grown in 30 l. of medium containing corn steep liquor (750 g.), starch (1200 g.), calcium carbonate (150 g.), dipotassium hydrogen phosphate (30 g.) and lard oil (60 ml.) is added a solution of 7.5 g. of 9α-fluorohydrocortisone dissolved in 100 ml. of dimethylformamide. Fermentation is continued for 88 hours, at which time the total steroid content of the broth assayed 132 μg./ml. Paper chromatographic analysis indicates that the content of the desired 9α-fluoro-2β,16α-dihydroxyhydrocortisone is 100μg./ml. The harvested broth is adjusted to pH 4.3 with 50% sulfuric acid, slurried with 2360 g. of diatomaceous earth filter aid, and filtered. The clear filtrate is reslurried with 30 l. of water at pH 3.6 and refiltered. The combined filtrates are neutralized to pH 6.4 with 20% sodium carbonate solution, then extracted three times with 25 l. portions of methyl isobutyl ketone. The pooled extracts are concentrated to a residue under reduced pressure, the residue is dissolved in 500 ml. of methanol, and analyzed chromatographically. The major steroidal component found is the desired 9α-fluoro-2β,16α-dihydroxyhydrocortisone. The methanol solution is evaporated, the solids so obtained are slurried in acetone/ethyl acetate, the undissolved solids then recrystallized from pyridine, from ethyl acetate, finally from acetone and water, yielding crystalline 9α-fluoro-2β,16α-dihydroxyhydrocortisone free from other steroids. After several other recrystallizations from acetone, the material melted 220–223° C., and is characterized by $[\alpha]_D$ —26.5°; λ max. in ethanol 238 mμ with ε 14,700.

EXAMPLE IX

*Preparation of 9α-Fluoro-16α,17α-Isopropylidenedioxy-2β,11β,21-Trihydroxy-4-Pregnene-3,20-Dione*

One hundred milligrams of 9α-fluoro-2β,11β,16α,17α,21-pentahydroxy-4-pregnene-3,20-dione is suspended in 5 ml. of acetone to which suspension are added several drops of 70% perchloric acid. The steroid rapidly dissolves in the acetone. The perchloric acid is neutralized with saturated aqueous sodium bicarbonate solution, the excess acetone removed by distillation in a vacuum, and the precipitated steroidal derivative is recovered by filtration. The crude acetonide may be crystallized from acetone/petroleum ether. The acetonide derivative exhibited infrared bands at 2.90μ consistent with the presence of three hydroxyl groups in the molecule (2β, 11β, and 21), 3.38μ, 5.80μ (the 20-carbonyl group), 5.92μ (the Δ⁴-3-carbonyl group, 6.10μ (the Δ⁴-group), 6.85μ, 7.20μ (C-methyl) 8.15μ(C—O—C), 9.40μ, 11.20μ, and 11.60μ. The mobility of the steroid on papergrams is less than that of the non-2β-hydroxylated analog.

EXAMPLE X

*Preparation of 2β,21-Diacetoxy-11β,17α-Dihydroxy-9α-Fluoro-4-Pregnene-3,20-Dione*

One hundred milligrams of 9α-fluoro-2β,11β,17α,21-tetrahydroxy-4-pregnene-3,20-dione, as obtained in Example VII is dissolved in 10 ml. of dry pyridine, and 0.1 ml. of acetic anhydride is added. After standing at room temperature over-night, the reaction mixture is quenched with excess methanol, and the solvents are removed under reduced pressure. Additional methanol is added and the preparation concentrated under reduced pressure until the odor of pyridine is removed, at which time the steroidal residue is dried well under reduced pressure. The residue may be crystallized from acetone/petroleum ether to yield fine needles, M.P. 132.5–140.5° (Kofler); $[\alpha]_D$ +48.7° (methanol); and homogeneous on paper chromatograms. The diacetate exhibits infrared adsorption bands at 2.90μ (consistent with the presence of two hydroxyl groups, at 2β- and at 17α), 3.41μ, 6.73μ, 5.78μ (20-carbonyl and acetate carbonyl groups), 5.95μ (Δ⁴-ketone), 6.15μ (Δ⁴-group), 7.29μ, 8.15μ, 9.54μ, and 11.32μ.

EXAMPLE XI

*Preparation of 2β,21-Diacetoxy-9α-Fluoro-17α,Hydroxy-4-Pregnene 3,11,20-Trione*

To a solution of 150 mg. of chromic anhydride in 15 ml. of dry pyridine is added a solution of 250 mg. of 2β,21-diacetoxy-11β,17α-dihydroxy-9α-fluoro-4-pregnene-3,20-dione in 20 ml. of pyridine. After 20 hours the solution is poured into water containing 0.7 g. of sodium bicarbonate. The mixture is steam distilled to remove pyridine, and then extracted with ethyl acetate. The extracts are washed well with water, then dried and concentrated under reduced pressure. The residue so obtained is crystallized from acetone/petroleum ether. Several recrystallizations are required to obtain the pure trione, homogeneous on paper chromatograms.

EXAMPLE XII

*Preparation of 9α-Chloro-2β,11β,17α,21-Tetrahydroxy-4-Pregnene-3,20-Dione*

Under fermentation conditions as described in Example II, using *S. roseochromogenus* and with glycerine as carbohydrate source, 9α-chloro-11β,17α,21-trihydroxy-4-pregnene-3,20-dione is converted to the 2β-hydroxy derivative, together with the 16α-hydroxy derivative, as per Example III. Papergram analyses permit determination of when to terminate the fermentation in such a manner as to yield optimum amounts of the 2β-hydroxy-9α-chloro-hydrocortisone. Isolation of the products and separation of the products in the same way as described in Examples V, VI, and VII gives pure crystalline 2β-hydroxy-9α-chloro-hydrocortisone.

EXAMPLE XIII

*Preparation of 9α-Chloro-2β,11β,16α,17α,21-Pentahydroxy-4-Pregnene-3,20-Dione*

Fermentation of 16α-hydroxy-9α-chlorohydrocortisone or of 2β-hydroxy-9α-chloro-hydrocortisone with *S. roseochromogenus* under conditions described in Examples I, II, and III yields as a major product the 2β,16α-dihydroxylated products, namely, 2β,16α-dihydroxy-9α-chlorohydrocortisone, which is indicated as a polar spot on paper chromatograms. The polar steroid spot is in the same vicinity as that of 2β-16α-dihydroxy-9α-fluorohydrocortisone and is positive to alkaline tetrazolium blue reagent.

EXAMPLE XIV

In a medium consisting of soybean oil meal, 20 g./l.; glucose, 40 g./l.; calcium carbonate, 2.5 g./l.; dipotassium hydrogen phosphate, 0.4 g./l.; and soybean oil, 2 ml./l. the Waksman strain of *S. roseochromogenus* (No. 3689) is grown, and 9α-fluorohydrocortisone is added as a solution in dimethylformamide so that the final steroid concentration is 500 μg./ml. Aerated fermentation is conducted for 96 hours, a sample being withdrawn at 72 hours. At 72 hours 32% of unaltered substrate remained, at 96 hours 26%. Paper chromatographic analysis indicates that the major steroid product is 9α-fluoro-16α-hydroxyhydrocortisone, with no 9α-fluoro-2β-hydroxy-hydrocortisone present.

EXAMPLE XV

Fermentation using the same strain as in Example XIV but lard oil is substituted for soybean oil, and the final steroid concentration is 250 μg./ml. gives instrumental analyses at 72 hours of fermentation of 80% as 9α-fluoro-16α-hydroxyhydrocortisone, at 96 hours of 90% of the same steroid. Paper chromatographic examination of the products indicated no 2β-hydroxylated product is present.

EXAMPLE XVI

Fermentation conditions exactly as described in Example XIV are carried out, except that the fermentation is continued to 144 hours. Analysis at that time indicates no unaltered substrate, 84% of 9α-fluoro-16α-hydroxyhydrocortisone, with no detectable 2β-hydroxylated product.

EXAMPLE XVII

Fermentation conditions employing a medium composition of corn steep liquor, 25 g./l.; starch, 40 g./l.; calcium carbonate, 5 g./l.; and lard oil, 2 ml./l. and subtrate of 9α-fluoro-hydrocortisone with the *S. roseochromogenus* Waksman strain indicates no 2β-hydroxylation has occurred after 72 hours of aerated fermentation.

EXAMPLE XVIII

Using the medium composition of Example XVII but employing the selected strain (ATCC 3347) the products of the fermentation are 62% of 9α-fluoro-16α-hydroxyhydrocortisone and 38% of the 2β-hydroxy product, 9α-fluoro-2β,16α-dihydroxyhydrocortisone.

EXAMPLE XIX

Using fermentation conditions exactly as described in Example XVIII a series of samples are withdrawn from the fermenting broth and analyzed for 2β-hydroxylated species. Both 9α-fluoro-2β-hydroxyhydrocortisone and 9α-fluoro-2β,16α-dihydroxyhydrocortisone are analyzed, as well as the non-2β-hydroxylated steroid 9α-fluoro-16α-hydroxyhydrocortisone.

2β-HYDROXYLATED STEROIDS

| Time | Unaltered Substrate 9α-Fluorohydrocortisone, percent | 9α Fluoro-2β hydroxy hydrocortisone, percent | 9α-Fluoro-2β,16α-dihydroxyhydrocortisone, percent | 9α-Fluoro-16α-hydroxyhydrocortisone, percent |
|---|---|---|---|---|
| 26 hours | 26 | 10 | | 64 |
| 48 hours | 0 | 11 | 9 | 71 |
| 72 hours | 0 | 8 | 13 | 74 |
| 96 hours | 0 | 10 | 23 | 60 |

EXAMPLE XX

In a medium described in Example XI of U.S. Patent No. 2,855,343 consisting of soybean meal, 15 g./l.; glucose 10 g./l.; soybean oil, 2.2 g./l.; calcium carbonate, 2.5 g./l.; with the pH adjusted to pH 7.0 the Waksman strain No. 3689 of *S. roseochromogenus* is grown under aerobic conditions. 9α-fluorohydrocortisone is added as a solution in ethanol so that the final steroid concentration is 330 μg./ml., and the fermentation continued for 72 hours. At this time about 38% of the unaltered substrate is left, 46% of the product 9α-fluoro-16α-hydroxyhydrocortisone is present, but no detectable amount of 2β-hydroxylated steroids could be found by chromatographic means.

EXAMPLE XXI

In a medium described in Example XVII of U.S. Patent 2,855,343 consisting of soybean oil, 8.8 g./l.; soybean meal 30 g./l.; cobalt nitrate dihydrate, 5 mg./l., the Waksman strain No. 3689 of *S. roseochromogenus* is grown. A solution of 9α-fluorohydrocortisone in ethanol is added so that the final steroid concentration is 330 μg./ml. and fermentation is continued for 72 hours, at which time chromatographic analysis indicated that 35% of the substrate remains unaltered. The product 9α-fluoro-16α-hydroxyhydrocortisone accounted for 50% of the steroids found, and no detectable 2β-hydroxylated products could be found.

EXAMPLE XXII

Five hundred milligrams of 9α-fluoro-2β,16α-dihydroxyhydrocortisone is dissolved in methanol and an equal volume of a 1% solution of sodium in methanol is added. After standing for fifteen minutes the solution is neutralized with acetic acid, and evaporated to dryness. After washing the residue with water, the insolubles are dissolved in alcohol, treated with decolorizing charcoal, and precipitated by the addition of ten volumes of water. The solids are chromatographed on diatomaceous earth using the solvent system dioxane/cyclohexane/water in the proportions 5:2:1, and the steroid fractions eluted and isolated by evaporation. Some unaltered starting material is recovered from the first fractions eluted; the rearrangement product, 9α-fluoro-2β,11β,16α,17aα-tetrahydroxy-17aβ-hydroxymethyl-4-D-homoandrostene 3,17-dione is recovered from later eluates.

We claim:
1. The compound 9α-fluoro-2β,11β,21-trihydroxy-16α,17α-isopropylidenedioxy-4-pregnene-3,20-dione.
2. A compound of the formula:

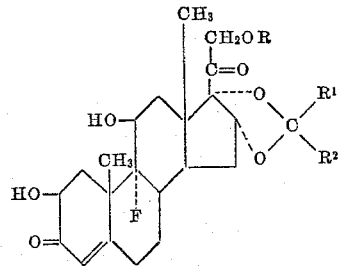

wherein R is selected from the group consisting of hydrogen and lower alkanoyl radicals and $R^1$ and $R^2$ are lower alkyl radicals.

References Cited in the file of this patent

UNITED STATES PATENTS

| | | |
|---|---|---|
| 2,280,828 | Inhoffen | Apr. 28, 1942 |
| 2,602,803 | Kaufmann et al. | July 8, 1952 |
| 2,666,016 | Hechter et al. | Jan. 12, 1954 |
| 2,756,179 | Fried et al. | July 24, 1956 |
| 2,773,058 | Bernstein et al. | Dec. 4, 1956 |
| 2,777,864 | Bernstein et al. | Jan. 15, 1957 |
| 2,910,487 | Julian et al. | Oct. 27, 1959 |
| 2,968,595 | Greenspan et al. | Jan. 17, 1961 |